(12) United States Patent
Geffert et al.

(10) Patent No.: US 8,364,031 B2
(45) Date of Patent: Jan. 29, 2013

(54) LIGHTING ASSEMBLY FOR AN IMAGE CAPTURING SYSTEM COMPRISING LED ELEMENTS

(75) Inventors: William Scott Geffert, Glen Rock, NJ (US); Marc Saes, Eindhoven (NL); Hubert Johan Marie Robert van Doorne, Waalre (NL)

(73) Assignees: Endolab Holding B.V., Eindhoven (NL); Imagingete Inc., Glen Rock, NJ (US)

( * ) Notice: Subject to any disclaimer, the term of this patent is extended or adjusted under 35 U.S.C. 154(b) by 0 days.

(21) Appl. No.: 13/063,247

(22) PCT Filed: Sep. 7, 2009

(86) PCT No.: PCT/NL2009/000175
§ 371 (c)(1),
(2), (4) Date: Jul. 26, 2011

(87) PCT Pub. No.: WO2010/030173
PCT Pub. Date: Mar. 18, 2010

(65) Prior Publication Data
US 2011/0280561 A1 Nov. 17, 2011

Related U.S. Application Data

(60) Provisional application No. 61/095,683, filed on Sep. 10, 2008, provisional application No. 61/221,191, filed on Jun. 29, 2009.

(51) Int. Cl.
*G03B 15/03* (2006.01)
*G03B 15/02* (2006.01)
*H04N 5/222* (2006.01)
(52) U.S. Cl. .............................. 396/164; 362/3; 348/371
(58) Field of Classification Search .................. 396/164, 396/155, 176, 106; 362/3, 5, 8, 11, 18; 348/371
See application file for complete search history.

(56) References Cited

U.S. PATENT DOCUMENTS

| 6,095,661 | A | 8/2000 | Lebens et al. |
| 7,255,457 | B2 | 8/2007 | Ducharme et al. |
| 2005/0135079 | A1* | 6/2005 | Yin Chua et al. ............... 362/12 |
| 2006/0203483 | A1* | 9/2006 | Rains, Jr. et al. ............. 362/231 |

FOREIGN PATENT DOCUMENTS

EP   1 138 747 A2   4/2001

* cited by examiner

*Primary Examiner* — Rochelle-Ann J Blackman
(74) *Attorney, Agent, or Firm* — Hoffmann & Baron, LLP

(57) ABSTRACT

The invention relates to a lighting assembly for an image capturing system. The lighting assembly includes at least one lighting element for generating light and a control system arranged to control the at least one lighting element and to interface with at least one camera of the image capturing system. The control system is arranged for controlling an intensity and a spectrum of the at least one lighting element. The control system is arranged to provide a control for emitting a constant light or a pulsed light with the at least one lighting element. The at least one lighting element includes at least one LED being at least one high CRI white LED.

18 Claims, 1 Drawing Sheet

LIGHTING ASSEMBLY FOR AN IMAGE CAPTURING SYSTEM COMPRISING LED ELEMENTS

CROSS-REFERENCE TO RELATED APPLICATIONS

This application is the National Stage of International Application No. PCT/NL2009/000175, filed Sep. 7, 2009, which claims the benefit of U.S. Provisional Application Nos. 61/095,683, filed Sep. 10, 2008, and 61/221,191, filed Jun. 29, 2009, the contents of all of which are incorporated by reference herein.

FIELD OF THE INVENTION

The invention relates to a lighting assembly for an image capturing system comprising a control system and at least one lighting element comprising at least one LED being at least one high CRI white LED wherein the control system is arranged for controlling an intensity and spectrum of the at least one lighting element. The control system is further arranged to provide a control for emitting a constant light or a pulsed light with the at least one lighting element.

BACKGROUND OF THE INVENTION

With traditional electronic flash systems such as Xenon flash tubes, prevalent in photography since the 1950's, users have been forced to preview images using tungsten modelling lamps as constant light which are 3200 k as opposed to the colour temperature of the flash (5000-5500 k). In addition to this issue regarding colour balance, for many years the industry struggles with ways to configure the orientation of the Xenon flash tube and the tungsten modelling light. This results in a sometimes dramatic difference in the character of light between the flash and the preview. This is relevant in for example photography for museum conservation, forensic photography, product photography, portrait photography, etc. Essentially, any application where the previewing of a scene needs to be colour critical or equal in character is relevant.

Early image capturing, especially in photography, relied on daylight for exposure due to the low sensitivity of the early photographic materials. As the technology matured tungsten lighting became prevalent. Electronic flash systems slowly became prevalent in photography since the 1950's and by the 1970's became the mainstream choice for colour photography. The primary benefit of electronic flash systems is the fact that a large quantity of light is released in a shorter time window compared to tungsten lighting (generally 1/400th sec to 1/10000th sec). This short duration capability allowed the photographer to freeze action such as a model's hair or glass breaking in extreme examples. However, more powerful electronic flash systems used in studios have a large time window and are therefore slower compared to low powered electronic flash systems found in for example cell phones. Electronic flash systems used in high-end studio flashes have the drawback that they have a relative large time window and limit the creative possibilities in image capturing.

With traditional electronic flash lighting solutions there is very little control of the Xenon flash event, and in most cases the light output ramps up and peaks to full power, then decades in a fixed pattern that cannot be controlled by the user. Traditional electronic flash systems have as drawback that they have relatively unpredictable characteristics and limit the creative possibilities of image capturing.

Electronic flash systems generally incorporate fragile and expensive glass tubes. Tungsten modelling lamps do not travel well and are prone to breakage. Also light forming accessories for electronic flash systems need to stand up to very high temperature due to 125 to 250 Watt tungsten modelling lamps and electronic flash systems comprising high energy density glass tubes. A drawback of state of art lighting equipment for image capturing is that the accessories are heavy and unsafe to handle.

With the advent of digital photography the use of solid state imaging systems such as CCD CMOS, the line between still image capturing and moving image capturing such as (HD) video capturing has been blurred. Several digital still image cameras employ both still and moving image capturing modes, and conversely many moving image cameras incorporate a still image capturing capability. It is a drawback that moving image capturing requires constant lighting, and for still image capturing, electronic flash systems have been the predominant technology.

Almost all traditional photographic light sources emit amounts of UV and infrared light spectrum. This has as drawback that the IR and UV light can damage certain frequency sensitive objects while capturing its image using flash. For example, this can be the case when photographing extremely rare documents or art works.

A viewing system is used to compare image prints or originals with the image displayed on a monitor. During such comparing, digital image users evaluate colour results. These viewing systems are usually 5000 k following ISO standard viewing conditions traditionally based on fluorescent tubes and have a colour rendering of about 85 to 95 CRI. A drawback of these viewing systems is that the spectrum emitted by the fluorescent tubes has distinct spikes, which accentuate the effect of metamerism. Metamerism is the matching of apparent colour of objects with different spectral power distributions. The negative effect of metamarism occurs in situations where two image samples match when viewed under one light source but do not match under another. Most types of fluorescent lights produce an irregular or peaky spectral emission curve, so that two image samples under fluorescent light might not match, even though they are a metameric match to an incandescent "white" light source with a nearly flat or smooth emission curve. Image sample colours that match, viewed under one source will often appear different under the other. Obviously, this is a further drawback in the image capturing process as evaluating colour results with conventional viewing systems is arbitrary.

It is well-known that lighting equipment in image capturing, especially in the high-end market, has as drawback that they are heavy in terms of weight. Large power supply units (usually referred to as "generators" or "power packs") are needed to supply tungsten lamps and/or electronics flash systems of sufficient energy to produce the high quality and high brightness lighting.

It is also a drawback that the recycle time (the time it takes for electronic flash systems to store and release energy) can be quite long. For example: a typical digital SLR system may be able to capture five images per second, but even the best studio electronic flash systems require one to four seconds between exposures at full power. This is a drawback for any number of photographic applications especially fashion, portraiture, sports, events, and any other type of photography where the camera capture rate needs to be responsive to the event being captured.

It is also well known that moving image capturing, such as motion picture and video imaging are based upon capturing a series of still images at fixed frequencies. This is also known as shutter speed and is expressed in frames per second (fps). Common shutter speeds are 24 fps or 30 fps. An alternative way to express the frequency of capturing the series of still images is the use of shutter time or exposure time, which defines a start of capturing a still image and an end of capturing the still image. Current lighting technologies include HMI, Tungsten modelling lamps, HF fluorescent, HID and electronic flash systems. A drawback of these systems is that they lead to expensive post-production and other colour corrections.

When capturing a specific frequency spectrum spectral cut filters are placed before dedicated camera lenses. This type of spectral imaging has benefits in for example when used in museums, medical, or law enforcement applications. In these cases specific spectral frequencies are filtered to highlight specific items such as a certain paint pigment, skin discolorations, blood stains or fingerprints. In digital imaging applications, multiple colour channels can be combined to create highly colour accurate images. Often this is accomplished using monochromatic CCD or CMOS sensors, but multispectral imaging can also be applied to common RGB type sensors. It is a drawback that colour CCD, CMOS and other sensor technologies have different spectral sensitivities as colour filter arrays are affixed to the monochromatic sensor or in the optical path. Light with frequencies within and beyond the visible spectrum are not effectively utilised for exposure and in fact, unwanted wavelengths of ultraviolet and infrared frequencies have to be blocked with additional filtration.

The known lighting system has the drawback that when utilised for (digital) image capturing (still image or motion image capturing) light not visible to a still or motion camera is not effectively utilised.

The known lighting system used in image capturing has the drawback that the resulting image does not always resemble the preview image limiting the possibilities of image capturers.

It is an object of the invention to at least partially eliminate the abovementioned drawback or to at least provide a usable alternative. In particular, it is an object of the present invention to provide an improved lighting system that allows for more accurate image capturing.

SUMMARY OF THE INVENTION

The main objective is to provide an improved lighting system that allows for more accurate image capturing.

The invention relates to a lighting assembly according to the present invention for an image capturing system comprising at least one lighting element for generating light. The lighting assembly further comprises a control system arranged to control the at least one lighting element and to interface with at least one camera of the image capturing system. The control system is further arranged for controlling an intensity and a spectrum of the at least one lighting element. The control system is further arranged to provide a control for emitting a constant light or a pulsed light with the at least one lighting element. The at least one lighting element comprise at least one LED being at least one high CRI white LED.

The at least one lighting element may emit pulsed light or emit constant light, depending on time. This may give the photographer more freedom. The constant light may be used to complement an ambient light of a space or surrounding as well as for exposing a photograph. The pulsed light is also named flash or flashed light. In photography pulsed light is used to temporarily illuminate a scene. This may be necessary to adequately expose the photograph or capture fast moving objects. To have one lighting element to emit pulsed light as well as constant light, depending on time, with a predefined intensity and/or spectrum may give the photographer more freedom. For example, at one moment the lighting element may pulse with certain intensity and frequency, the other moment the lighting element may transmit constant light with a substantially same intensity and frequency. Another advantage is that the at least one lighting element comprising at least one LED and the related control system may offer reduced recycle time between each pulse (flash). It is well known that the recycle time (the time it takes for state of the art studio and portable electronic flash systems to store and release energy) can be quite long anywhere from one to four seconds. Therefore any number of photographic applications especially fashion, portraiture, sports, events, and any other type of photography where the camera capture rate needs to be responsive to the event being captured may benefit. Another advantage is that the control system may be arranged to set spectrum and intensity to ICC/ISO compliant standards and guidelines. This includes setting the luminance (a photometric measure of the density of luminous intensity in a given direction). The control system may also be arranged to set the display of a (digital) camera to ICC/ISO compliant standards and guidelines. For example, it may set display white point, gamma and specific colour gamut to match one or more industry accepted targets such as 6500 k 2.2 gamma 160 luminance or 5000 k or 1.8 gamma 120 luminance etc. This may result in the same and standardized preset lighting conditions throughout the workflow of image capturing. The lighting assembly may comprise more lighting elements.

The lighting elements may comprise of a single LED or an array of LED's. These LED's may be of the high brightness type. The LED's may be arranged in linear, circular or area array or any arbitrary format. The pulse light may be generated by the LED's in the lighting element at any instance to be controlled by the control system as an input from a user or camera. The spectrum defines the colour of light and may be equivalently expressed in terms of frequency or radiating temperature of light. Using multiple LED's in the at least one lighting element may allow the lighting assembly to emit sequentially various spectra and intensities of light, without having to change the lamps. Emitting various spectrums without changing lamps may allow a photographer to use a more interactive form of image capturing. This may be done by placing one or more off-the-shelve LED's with relevant colour frequency in an arbitrary way. By incorporating multiple coloured LED's in addition to high CRI white LED's the invention may allow for precise control of colour mixing. This may allow the user to fine tune the colour balance of the light. By beginning with the full spectrum high CRI white 5000 k white light and adding additional channels the invention may offer the ability to emit for example a pure saturated red and/or the most subtle hint of red balance. For digital imaging, this ability may give the photographer brand new capabilities that in the past could only be achieved with colour gels. A portrait photographer may balance a digital camera to the white light and then introduce a specific colour blend to accentuate skin tone. Users may work with "free form" adjustments, or can select preset colour temperatures to emulate traditional light sources, or user defined presets. Working in this manner may allow the photographer to minimize post-capture editing to achieve creative colour effects. The photographer may be able to be creative in real time, and as stated earlier, the colour of the modelling light produced by the constant light source may be the same colour as the light exposing the camera. Essentially, the lighting assembly may have accurate control of spectrum and intensity with respect to time. This lighting assembly may also result in a reduced waiting time in life image capturing sessions, since the e.g. actual sunlight colour effect can easily be compensated for. The peak output of the pulse light may be more than 2× the constant power output when emitting with constant light. This ratio between pulse light power output and constant light power output may be much greater. The lighting assembly has as advantage that it may produce a large quantity of light in a relatively short time window. Another advantage is that the control system may be able to overcome the drawback of electronic flash systems in terms of slow recycle time. Another advantage is that the LED's may have a longer lifetime compared to Xenon tubes and/or tungsten lamps that may lower the lamp-exchange cost. Another advantage is that LED's may be more energy efficient than other light sources. In the image capturing industry the use of constant tungsten lamps often requires 1000 watts each. Also electronic flash systems easily draw peaks of 20 Amperes from the AC mains. Using LED's may allow the energy footprint of a typical photo studio operation to be reduced. Therefore, there may be less need for heavy power supplies, such as generators, power packs or batteries. The lighting assembly may have a reduced weight compared to state of art lighting systems that make use of tungsten lamps and/or electronic flash systems. A solid state LED may be more robust over electronic flash such as Xenon tubes and tungsten modelling lamps. With the lower operating temperatures of the LED's, lighting accessories may be more versatile, less expensive, and lighter. Another advantage over known lighting systems is that the lighting assembly may be arranged to only emit frequencies inside the visible light spectrum. This may result in not damaging objects that are sensitive to non-visible light. A further advantage is that the lighting assembly may be arranged to closely match a spectral energy response of a specific image capturing sensor. This may result in optimal quality and may reduce energy consumption by more effectively utilising light energy. By optimising the match between the light energy and the spectrum to the specific image capturing sensor's capabilities, the quality may be improved and optimised. Note that, the lighting assembly comprising LED's may allow colour management throughout the whole workflow of image capturing.

The at least one lighting element comprises at least one high CRI white LED. There may be multiple lighting elements in the lighting assembly. The at least one lighting element that comprises at least one high CRI white LED has as advantage that this may result in what you see in your preview image is what you get from your resulting image when photographing in daylight. Depending on the settings of the control system, the lighting element may emit pulsed or constant light with the high CRI white LED.

The control system may have an interface with the camera to for example provide an input to the control system or to provide an input to the camera. For the case of providing an input from camera to the control system; the camera may provide the trigger to pulse (flash) based on the measurements of its integrated light meter. For example, this trigger may be communicated to a pulse source by a X-type shutter sync or hot shoe terminal. The trigger may be sent to the control system that in its turn ensures that the lighting elements flash correspondingly. It may also be the case that a Through The Lens (TTL) system (via various proprietary cables or any other wired or wireless communication system) is included in the camera. A TTL system already has a certain logic available. The control system may be arranged that it also interfaces with a TTL system when available. The control system may also allow for reading out the actual CCD raw values, or to read out pushed (to the camera) lighting values that are to be written to file metadata. For the case of providing an input from the control system to the camera; the control system may set the display settings of the camera (in case of a digital camera, e.g. a DSLR camera) to a ICC/ISO standard profile. Another example is that the control system may set the white balance of the pulse generated by the camera if necessary (or turns it off). The control system may be arranged to control all settings that are available on the camera. Examples are, but are not limited to, shutter speed, white balance, colour temperature or Kelvin temperature presets, aperture settings, autofocus, self timer, file format, preset lighting colour, timing parameters etc. The interface for this two way communication may, for example, be based on RS-232, USB, Firewire or any wired or wireless interface and corresponding protocol.

The control system may be arranged to control more characteristics of the lighting elements which is explained in further embodiments described below.

In another embodiment of the lighting assembly according to the present invention, the control system is arranged to provide a control for emitting a spectrum of light emitted by the at least one lighting element that is substantially equivalent to a spectrum of an ambient light.

For example, pulsed light may be set to an ambient light of the surroundings or constant light may be set to an ambient light of the surroundings. This has advantage that by emitting light with the same spectrum as the ambient light may allow an increased what you see on your preview is what you get in your image. It has a further advantage that a red-eye effect in a captured image may be reduced. The pulsed light may be substantially equal to the ambient light and an increase in intensity may be less noticed by a person to be captured compared to a pulsed light with a deviant spectrum, which may result in a smaller opening of the pupils during flash.

In another embodiment of the lighting assembly according to the present invention, the control system is arranged for controlling with respect to time. This may allow the lighting assembly to have full dynamic control. The control system may alter the dynamics of the light during the exposure window on a single or multiple channel basis. The lighting elements may be synchronized with the image capturing apparatus, such as the at least one camera. The at least one lighting element may for example be synchronized with a shutter of the at least one camera. Using the lighting assembly may offer brand new creative capabilities and photographic effects such as multi coloured trails, stroboscopic effects, or selective blur. This embodiment may open up the capability of leveraging individual multi-channel light output over time during the exposure event. This has as advantage that the lighting assembly may increase the ease of work of the user and the creative possibilities. An other advantage is that a red-eye effect in a captured image may be reduced. This embodiment may allow a duration of a pulsed light to be larger than a pulse light generated with state-of-art lighting systems such as Xenon light. Increasing the duration of the pulsed light may result in extra time for pupils of a person to be captured to close, reducing the red-eye effect. Moreover, increasing the duration of the pulsed light may allow for a reduction of intensity of the pulsed light maintaining a same illumination needed for image capturing. This reduction of intensity may result in a smaller opening of the pupils during pulse.

In another embodiment of the lighting assembly according to the present invention, the at least one lighting element comprises at least five LED's. Four of these LED's are each arranged to provide a colour channel. These four colour channels are high CRI white, red, green, blue. The fifth LED is arranged to provide an additional channel. This additional channel may be of any visible or non-visible spectrum. For example, a high CRI white may have a distinct hole in the blue area of the spectrum. The additional channel may be used to fill this spectral hole. This has as advantage that with a relatively low number of LED's a broad spectrum may be covered. This may include pure saturated red or subtle hint of red balance. This may reduce the costs as colour gel based constant lights may not be necessary. Depending on the settings of the control system, the at least one lighting element with the at least five LED's may emit pulsed or constant light.

In another embodiment of the lighting assembly according to the present invention, the control system is arranged to provide an interface with at least one light sensor arranged for measuring at least the intensity and/or spectrum of the ambient light. This light sensor may measure the ambient light at least in terms of frequency, but may be extended to measure light in terms of intensity. This light sensor may be a dedicated light sensor or hand-held spectrophotometer, but may also be a standard light sensor that is already comprised in the camera. The light sensor in this latter view may be seen broadly. The camera may give input via the control system from the build-in imaging sensor, light metering sensor, standard spectrophotometer or hand-held sensor (colour meter) etc. The control system may also be arranged to receive data regarding a shutter of the at least one camera. This may result in a bidirectional communication between the at least one lighting element and at least one camera. Measuring frequency and/or intensity of light may be particularly useful for workspace and interior area lighting during image capturing, as the frequency of ambient light in such areas is difficult to estimate with the naked eye.

In one embodiment of the lighting assembly according to the present invention, the control system is arranged for providing a feedback of the measured intensity and/or spectrum to the output of the at least one lighting element. The measured intensity and/or spectrum may be fed back to multiple lighting elements if necessary. The at least one lighting element may produce a flash or pulsed light based on the spectrum and intensity of the ambient light. In an example, the light sensor may be placed remotely from the scene to be captured. The measured spectrum of the ambient light in that remote scene may be used to control the output of the constant light source at the image scene. This may allow to copy spectra of light from one scene to another scene, increasing ease of use. The same may hold for the case as the lighting element is used as pulsed light source. In another example, the feedback of ambient light via a wired or wireless light sensor or camera sensor may allow for automated control of frequency and intensity of the at least one lighting elements.

In another embodiment of the lighting assembly according to the present invention, the control system is arranged to provide a control for the emitted spectrum of the pulsed light and/or constant light to be substantially equivalent to the measured spectrum. For example, the lighting element may produce a pulse in the same spectrum as measured. This has as an advantage that the flash light may have the same colour as the ambient light allowing to see a preview image that corresponds to a resulting image. It has a further advantage that a red-eye effect in a captured image may be reduced. The pulsed light may be substantially equal to the ambient light and an increase in intensity may be less noticed by a person to be captured compared to a pulsed light with a deviant spectrum, which may result in a smaller increase of the pupils during flash.

In another embodiment of the lighting assembly according to the present invention, the control system is arranged to provide a dynamic time control of the intensity and/or spectrum of the at least one lighting element. Using the lighting assembly may offer brand new creative capabilities and photographic effects.

In another embodiment of the lighting assembly according to the present invention, the control system is arranged to provide a dynamic time control with respect to a shutter of the at least one camera. The shutter of the camera may be dynamically controlled with respect to time. This may enable unlimited combinations of (serial) shutter-times with respect to time. Using the lighting assembly with a dynamically controllable shutter may offer brand new creative capabilities and photographic effects.

In a further embodiment of the lighting assembly according to the present invention, the control system is arranged to provide synchronization between the intensity and/or spectrum of the at least one lighting element and the shutter of the at least one camera. This may allow the lighting element to be synchronized with the opening and closing of the camera shutter or vice versa. Using the lighting assembly may offer brand new creative capabilities and photographic effects.

In a further embodiment of the lighting assembly according to the present invention, the control system is arranged to provide a synchronization between the shutter of the at least one camera and the at least one lighting element for emitting multiple pulses in one shutter time. Using the lighting assembly may offer brand new creative capabilities and photographic effects such as multi coloured trails, stroboscopic effects, or selective blur. This embodiment may open up the capability of leveraging individual multi-channel light output over time during the exposure event. This has as advantage that the lighting assembly may increases the ease of work of the user and the creative possibilities.

In a further embodiment of the lighting assembly according to the present invention, the control system is arranged to provide a control for emitting a substantially clean visible light. So, the lighting element comprises LED's with a certain frequency range or spectrum and may be set by the control system to emit an almost immeasurably low amount of light beyond the visible spectrum. In art conservation, this may enable for the first time a light source that may be used to photograph light-sensitive artworks as safely as possible. Thus, this embodiment may provide a clean visible light spectrum that does not emit frequencies outside this spectrum. It is important to point out that in some instances for frequency sensitive applications UV and IR light is desirable, and that this embodiment may incorporate non-visible spectrum LED's to satisfy the requirement of the frequency sensitive application. This may be achieved by placing LED's that may transmit frequencies outside the visible spectrum in the at least one lighting element.

In a further embodiment of the lighting assembly according to the present invention, the control system is arranged to provide a control for predefining a specific spectrum with corresponding intensity. This may enable benefits in multi-spectral image capturing. The lighting elements may be transmitting for example in 11 channels (or more) of colour. Using multiple channels may improve the accuracy of the light source and may enable the lighting elements to emit at accurate predetermined spectra. In multi-spectral imaging, this may open up opportunities to compensate for deficiencies in conventional CCD and/or CMOS sensors as it may enable the ability to capture an expanded colour gamut. In general digital photography is considered to be an RGB process. However, it is already possible for ink jet printers to incorporate 6 to 12 channels (or more) of colour to improve the quality. By extending the lighting elements with a number of channels, benefits may be enabled in multi-channel capture. When used in museums, medical, or law enforcement applications specific spectral frequencies may be used to highlight specific items such as a certain paint pigment, skin discolorations, blood stains or fingerprints. Currently, multi-spectral imaging is based on capturing multiple digital images through a series of spectral cut filters in from of a dedicated camera lens. This way, certain specific frequencies can be highlighted. However, this solution is limited to high-end scientific cameras that are very costly. Instead of using costly filters, the specific spectrum of frequencies may be emitted with LED elements that contain multiple channels. Using more channels may improve the colour accuracy. This approach may be used with any RGB or monochromatic digital sensor, for example CCD or CMOS based. A further advantage is that in capturing specific frequency spectra no expensive dedicated hardware such as spectral cut filters and customized shutter mechanisms may be needed. Another advantage is that the lighting assembly may be arranged to closely match a spectral energy response of a specific image capturing sensor. This may result in optimal quality and may reduce energy consumption by more effectively utilising light energy. By optimising the match between the light energy and the spectrum to the specific image capturing sensor's capabilities, the quality may be improved and optimised. This embodiment may allow the light to instantaneously alternate between various combinations of intensity and spectrum of at least one lighting element. This may enable the use of constant light output for viewing a scene and light optimised for digital capture in precise time synchronization with the shutter of a camera or sync signal for the exposure of a video camera sensor. In this embodiment the dynamic control of light output and spectral emission may be optimised specifically for digital imaging while still retaining the colour accuracy required for human visual response.

In another embodiment of the lighting assembly according to the present invention, the control system is arranged to provide a control of multiple lighting elements to be networked together. This may allow the multiple lighting elements to operate as one dynamic light source. It also may allow the creation of distinct falloff patterns or gradations, or timing control for dramatic effects in high CRI white or multiple colour channels in combination with other embodiments described above.

In another embodiment of the lighting assembly according to the present invention, the control system is arranged to provide a control of multiple lighting assemblies to be networked together. This may allow the multiple lighting assemblies to operate as one dynamic light source. It also may allow the creation of distinct falloff patterns or gradations, or timing control for dramatic effects in high CRI white or multiple colour channels in combination with other embodiments described above.

In another embodiment of the lighting assembly according to the present invention, the lighting assembly further comprises a viewing system for comparing images. The control system is arranged to provide a control for the viewing system. The viewing system comprises at least one LED. This may allow a viewing system wherein the light source used may have a continuous spectrum that may be set to emit with the same frequency as has been used during the capturing of the image. The at least one LED in the viewing system may be arranged to provide a continuous spectrum. The conventional fluorescent tubes with irregular or peaky spectral emission curves may be replaced by LED's that have a more continuous spectrum. A viewing system equipped with these LED's as light source may be used for ISO/ICC compliant standard colour evaluation (5000 k high CRI 90+). As the LED's may reproduce the exact frequency of the light used when capturing the image an optimal comparing may be performed. On top of this computer displays but also HD televisions (on which you compare your image with) already use LED backlighting more often and often. The use of LED's that may be controlled with respect to frequency and intensity during the complete workflow from capturing to print may result in a high level of "what you see is what you get". Not only this may allow the viewing light to be the same as the capture light, but it may also allow interaction with the display settings of the camera and measurements from the light sensor (dedicated or built-in camera, etc.). For example, the measurement of the display (via a preset ICC profile) may be used to give the feedback via the control system to the viewing system and lighting assembly, so the spectral fingerprint of the display (white point, colour, brightness etc.) may be "cloned" or reproduced. This feedback may allow to set the lighting conditions during capture of the photograph. By using an ICC profile as a roadmap the colour information may be provided to the control system that may feed this information to lighting assembly and viewing system. The control system may also be arranged to provide communication from viewing system to control system. For example, luminance/intensity and/or spectrum settings may be communicated to the control system. This may be fed back to a display so the display and viewing system can match better. It may be possible to match both spectrum (colour) and intensity (luminance) dynamically. Thus, this embodiment may provide a non-arbitrary tool for consistently evaluating image colour results.

In another embodiment of the lighting assembly according to the present invention, the camera comprises a moving image camera, in which the control system is arranged to provide a control for the at least one lighting element in time synchronisation with a signal representing an image capturing time of the moving image camera. This may allow energy savings as the at least one of the lighting elements is now able to stop emitting when no image capturing occurs. The moving image camera may capture consecutive still images. The moving image camera may comprise for example a video camera that is arranged to capture digitally or comprises a film camera that is arranged to capture analogously. The image capturing time may comprise any type of time information relating to the capturing of at least one still image. For example, the image capturing time may comprise a shutter time or exposure time, which defines a start of capturing a still image and an end of capturing the still image. In another example, the image capturing time may comprise a total shutter time which comprises the sum of all consecutive shutter times for a certain time period. In a further example the image capturing time may comprise a frame rate or image rate, which defines the number of unique still images captured per second. The control system may be arranged to interface the signal representing the image capturing time with the moving image camera. The control system may be arranged to interface the signal from the control system to the camera or vice versa or both. The signal may be transmitted through any type of interface, including by wire or wireless using any suitable protocol or interface standard. The control for the at least one lighting element may be suitable to control any characteristic of the at least one lighting element. For example, the control may be suitable to control intensity, turning on and turning off, spectrum, period of emission, number of emissions per second and/or duty cycle. The time synchronisation of the control for the at least one of the at least one lighting element with the signal may comprise any combination of synchronisation in time between the characteristics of the at least one of the at least one lighting element and the image capturing time. For example, a turning on and a turning off of the at least one lighting element may be synchronised in time with a shutter time of the moving image camera. In a further elaboration of this example, an often used shutter time is 1/1000 second. An often used frame rate is 24 unique images per second. This corresponds to a total exposure time of 24/1000 seconds in one second. This implies that 976/1000 second in one second there may be no need for emission as no capturing occurs. When the turning on is synchronized in time with the end of the shutter times and the turning off is synchronized in time with the start of a first consecutive shutter time an energy saving of 97.6% may be achieved. Any other combination, for example a synchronisation in time of the frame rate with the number of emissions per second, is possible and foreseen.

In another embodiment of the lighting assembly according to the present invention, the lighting assembly comprises at least two lighting elements for generating light, wherein the control system is arranged to provide a control for emitting a constant light with a first one of the lighting elements and emitting a pulsed light with a second one of the lighting elements.

It must be noted that each one of the two lighting elements can be a first one of the lighting element or a second one of the lighting element. In other words, each lighting element can emit pulse light or emit constant light, depending on time.

In another embodiment of the lighting assembly according to the present invention, the lighting assembly includes a control system which is arranged to provide a control for emitting a constant light and/or a pulsed light that is optimized for capturing with the camera and/or human visual response by controlling the intensity and spectrum of the at least one lighting element.

In another embodiment of the lighting assembly the control system is arranged to be external to the at least one lighting element. The signals, among which the measurements, may be transmitted wirelessly using for example optical and/or RF transponders or may be transmitted through wires. The control system may be an external computer with software or firmware, FPGA's, transistors, MOSFET, etcetera. This control capability may be incorporated directly into the at least one camera via a wired or wireless interface creating an integrated closed loop. This has as advantage that the lighting assembly may increases the ease of work of the user.

In another embodiment of the lighting assembly the control system is arranged to be partly onboard the at least one lighting elements. For example part of the control system that is arranged for controlling individual LED's to emit a preset spectrum may be placed on board a lighting element. This has as advantage that the lighting assembly may increases the ease of work of the user In another embodiment of the lighting assembly the control system is arranged to communicate wirelessly between the at least one camera and/or the at least one lighting element. External controls may be in direct connection to a computer and/or camera via wired or wireless connectivity, or a wired or wireless remote control device. For example, the control may offer the ability to switch modes from continuous to pulse or combinations thereof. It also may offer the ability to control frequency based on direct or remote input from a user. The frequency may also be controlled based on preset values as well. It also may allow direct or preset control of the duration of certain frequencies and/or intensity as well as the creative effects options described above. Examples of wireless communication are optical and/or RF based receivers, transponders and transmitters. As an example, use may be made of a communication network for synchronizing multiple second lighting elements for pulsing at the same time or in a predefined sequence. This has as advantage that the lighting assembly may increases the ease of work of the user.

In another embodiment of the lighting assembly the at least one lighting element comprises LED's that are arranged to provide a substantially clean visible light. LED's may be chosen that comply to the wished specifications of the user. This has as advantage that the lighting assembly may increases the ease of work of the user.

In another embodiment of the lighting assembly the at least one lighting element comprises at least five LED's in which each LED is arranged to provide a different colour channel.

In another embodiment of the lighting assembly the at least one lighting element is arranged to be compatible with common photographic accessories such as reflectors, soft boxes, grid spots etcetera. This may be achieved by including a fixture that may be compatible with the form factor of the at least one lighting element and the adaptor plates. The lighting element may be arranged to fit into the light modification accessories that are already known. For example, a portable soft box that resembles a tent where wands plug into an adaptor ring is an already known photographic accessory. These adaptor rings are designed to mate to any number of existing flash heads. In this embodiment the fixture that is comprised in the at least one lighting element may be arranged to be compatible with these adaptor rings. This may increase versatility of the at least one lighting element. The at least one lighting element may be positioned between various light shaping elements and a subject being illuminated. These light shaping elements may be but are not limited to Fresnel lenses, Convex, Concave, and Condenser lenses, Glass, Acrylic or Plexiglass lenses, Diffusion films and light redirection elements. The lighting assembly may also be incorporated as a retrofit kit for existing lighting fixtures and light shaping accessories.

In another embodiment of the lighting assembly the at least one lighting element is arranged to interface with at least X sync and/or TTL sync control based interfaces. The lighting element may comply with popular camera interfaces including X sync (PC and/or hot shoe) and TTL sync control via hot shoe or dedicated TTL cables and beyond. For example, a MOSFET or another transistor may be placed to arrange for such an interface. As digital cameras often employ built-in colour sensors this data may also be utilized.

In another embodiment of the lighting assembly according at least one lighting elements is arranged to be fixed on a support structure. The lighting elements may be fixed on the support structure in an array. This array may be placed round, square, rectangular or have any other geometric shape.

In another embodiment of the lighting assembly at least one lighting element is arranged to be fixed with a foldable support structure. Multiple lighting elements may be fixed in e.g. an array to the foldable support structure. This foldable support structure may be an articulated support structure resembling a venetian blind or a roll-top desk. The lighting elements may be arranged to be fixed to the foldable support structure such that the lighting assembly may be easily rolled up into a compact unit for travelling or to alter the character of light.

In another embodiment the viewing system is arranged to be used as a standalone solution. The viewing system may be detachable from the control system.

The lighting assembly in all its embodiments does not have to be limited to the digital still photographic market, although the advantages are obvious for this market. The lighting assembly may also be used in non digital, as well as moving image capturing, such as video, motion picture, as well as colour-critical task lighting and area lighting applications such as but not limited to art galleries, museums, libraries, hospitals or retail installations where accurate colour viewing is essential. It must be noted, that all combinations of embodiments may be possible and foreseen.

DETAILED DESCRIPTION OF THE DRAWINGS

Figure 1:
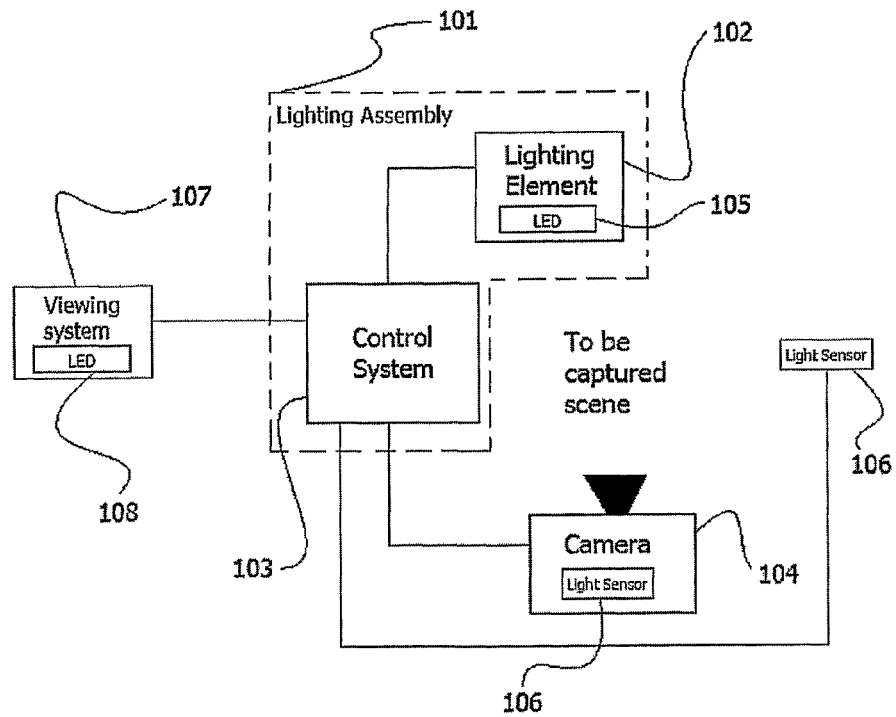
FIG. 1 shows a schematic block diagram of a lighting assembly according to an embodiment of the invention.
Figure 2:
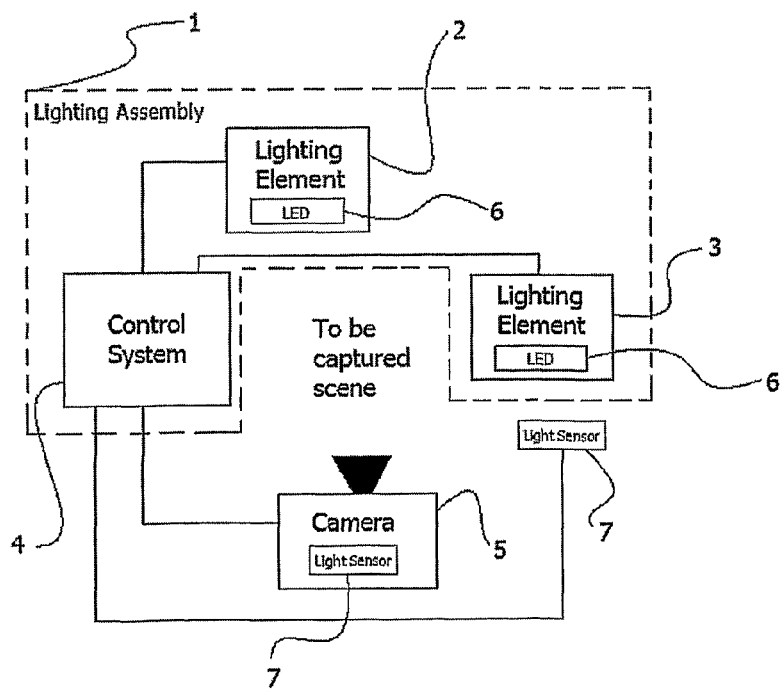
FIG. 2 shows a schematic block diagram of the lighting assembly according to another embodiment of the invention.

FIG. 1 shows one lighting element (102) for generating light. Here, only one lighting element is displayed. However, there can be more lighting elements. The lighting assembly (101) furthermore comprises a control system (103). The control system (103) is arranged to control the at least one lighting element (102) and to interface with at least one camera (104). The control system (103) is arranged for controlling an intensity and a spectrum of the at least one lighting element (102). The at least one lighting element (102) comprises at least one LED (105). The at least one lighting element (102) can comprise one or more LED's (106) depending on the different embodiments and use of the light assembly. This lighting assembly (101) is used in image capturing of a to be captured scene. The lighting assembly (101) can generate light that is controllable with respect to intensity and frequency depending on the wishes of the photographer. Interfacing with at least one lighting sensor (106), allows the control system to emit light based on the measurements. In one embodiment, it allows for emitting pulsed light with the same frequency as the constant light. The light sensors (106) can be dedicated light sensors or light sensors already placed in cameras or hand-held spectrophotometers (104). The measurements of the light sensors (106) can be fed back to the at least one lighting element (102). The at least one lighting element (102) can base its emitted frequency and intensity on the measurements. This increases among others creativity of the photographer and also reduces the time needed by the photographer. In a further embodiment the lighting assembly (101) can further comprise a viewing system (108) for comparing images. This viewing system (107) can comprise one or more LED's (108). The LED's used in the viewing system can be of the same type of the LED's used during capturing. By arranging the control system (103) to control the viewing system (107) it is possible to use light for viewing that has the same characteristics as during capturing. Moreover, using LED's give a more continuous spectrum without annoying spikes in the spectrum. It must be noted that the arrangement of the elements in FIG. 2 is just one example of possible arrangements. In an embodiment the viewing system can be utilized as a standalone solution.

FIG. 2 shows two lighting elements (2, 3) for generating light. Here, only two lighting elements are displayed. However, there can be more lighting elements. The lighting assembly (1) furthermore comprises a control system (4). The control system (4) is arranged to control the lighting elements (2, 3) and to interface with a camera (5). The control system is arranged to provide a control for emitting a constant light with a first one of the lighting element (2) and emitting pulsed light with a second one of the lighting element (3). Which one of the lighting elements is first or second is dependent on time and/or place. Each lighting element (2, 3) comprises at least one LED. Each lighting element (2, 3) can comprise one or more LED's (6) depending on the different embodiments and use of the light assembly (1). This lighting assembly (1) is used in image capturing of a to be captured scene. In an embodiment, the lighting assembly (1) can generate pulsed or constant light with controllable intensity and frequency depending on the wishes of the photographer. Interfacing with at least one lighting sensor (7), allows the control system to emit pulsed light or constant light based on the measurements. In one embodiment, it allows for emitting pulsed light with the same frequency as the constant light. The light sensors (7) can be dedicated light sensors or light sensors already placed in cameras or hand-held spectrophotometers (5). The measurements of the light sensors can be fed back to the lighting elements (2, 3). The lighting elements (2, 3) can base their emitted frequency and intensity on the measurements. This increases among others creativity of the photographer and also reduces the time needed by the photographer. It must be noted that the arrangement of the elements in FIG. 1 is just one example of possible arrangements.

CLAUSES

1. Lighting assembly for an image capturing system, the lighting assembly comprising;
   at least one lighting element for generating light;
   and a control system, arranged to control the at least one lighting element and to interface with at least one camera of the image capturing system, wherein
   the control system is arranged for controlling an intensity and a spectrum of the at least one lighting element, wherein
   the control system is arranged to provide a control for emitting a constant light or a pulsed light with the at least one lighting element, wherein
   the at least one lighting element comprises at least one LED being at least one high CRI white LED.

2. Lighting assembly according to clause 1, in which the control system is arranged to be external to the at least one lighting element.

3. Lighting assembly according to clause 1, in which the control system is arranged to be at least partly onboard the at least one lighting element.

4. Lighting assembly according to clause 1, in which the control system is arranged to communicate wirelessly between the at least one camera and/or the at least one lighting element.

5. Lighting assembly according to clause 1, in which the at least one lighting element comprises at least five LED's, in which each LED is arranged to provide a different colour channel.

6. Lighting assembly according to clause 1, in which the at least one lighting element comprises at least one LED that is arranged to provide a substantially clean visible light.

7. Lighting assembly according to clause 1, in which the at least one lighting element comprises a fixture that is arranged to fit with photographic accessories.

8. Lighting assembly according to clause 1, in which the at least one lighting element is arranged to interface with at least X sync and/or TTL sync control based interfaces.

9. Lighting assembly according to clause 1, in which at least one lighting element is arranged to be fixed on a support structure.

10. Lighting assembly according to clause 1, in which at least one lighting element is arranged to be fixed with a foldable support structure.

11. Viewing system according to clause 10 in which the viewing system is arranged to be used as a standalone solution.

12. Lighting assembly for an image capturing system, the lighting assembly comprising;
   at least two lighting elements for generating light;
   and a control system, arranged to control the at least two lighting elements and to interface with at least one camera of the image capturing system, wherein
   the control system is arranged to provide a control for emitting a constant light with a first one of the lighting elements and emitting a pulsed light with a second one of the lighting elements, wherein
   each lighting element comprises at least one LED.

The invention claimed is:

1. A lighting assembly for an image capturing system, the lighting assembly comprising;
   at least one lighting element for generating light;
   and a control system, arranged to control the at least one lighting element and to interface with at least one camera of the image capturing system,
   wherein the control system is arranged for controlling an intensity and a spectrum of the at least one lighting element,
   wherein the control system is arranged to provide a control for emitting a constant light or a pulsed light with the at least one lighting element,
   wherein the at least one lighting element comprises at least one LED being at least one high CRI white LED,
   wherein the control system is arranged to provide a control for predefining a specific spectrum with corresponding intensity, and
   wherein the control system is arranged to provide an intensity and/or spectrum of the at least one lighting element that closely matches a spectral energy response of an image capturing sensor.

2. The lighting assembly according to claim 1, in which the control system is arranged to provide a control for emitting the spectrum of light emitted by the at least one lighting element that is substantially equivalent to a spectrum of an ambient light.

3. The lighting assembly according to claim 1, in which the control system is arranged for controlling with respect to time.

4. The lighting assembly according to claim 1, in which the at least one lighting element comprises at least five LED's, in which
   four LED's are each arranged to provide a colour channel, in which the colour channels are high CRI white, red, green and blue;
   and one LED is arranged to provide an additional channel, in which the additional channel is of any visible or non-visible spectrum.

5. The lighting assembly according to claim 1, in which the control system is arranged to provide an interface with at least one light sensor arranged for measuring at least the intensity and/or spectrum of the ambient light.

6. The lighting assembly according to claim 5, in which the control system is arranged to provide a feedback of the measured intensity and/or spectrum to the output of the at least one lighting element.

7. The lighting assembly according to claim 6, in which the control system is arranged to provide a control for the emitted spectrum of the pulsed or constant light by the at least one lighting element to be substantially equivalent to the measured spectrum.

8. The lighting assembly according to claim 1, in which the control system is arranged to provide a dynamic time control of the intensity and/or spectrum of the at least one lighting element.

9. The lighting assembly according to claim 1, in which the control system is arranged to provide a dynamic time control with respect to a shutter of the at least one camera.

10. The lighting assembly according to claim 1, in which the control system is arranged to provide a synchronization between the intensity and/or spectrum of the at least one lighting element and the shutter of the at least one camera.

11. The lighting assembly according to claim 10, in which the control system is arranged to provide synchronization between the shutter and the at least one lighting element for emitting multiple pulses in a shutter time.

12. The lighting assembly according to claim 1, in which the control system is arranged to provide a control for emitting a substantially clean visible light.

13. The lighting assembly according to claim 1, in which the control system is arranged to provide a control of multiple lighting elements to be networked together.

14. The lighting assembly according to claim 1, in which the control system is arranged to provide a control of multiple lighting assemblies to be networked together.

15. The lighting assembly according to claim 1, further comprising a viewing system for comparing images, in which the control system is arranged to provide a control for the viewing system, wherein the viewing system comprises at least one LED.

16. The lighting assembly according to claim 1, in which the camera comprises a moving image camera, in which the control system is arranged to provide a control for the at least one lighting element in time synchronisation with a signal representing an image capturing time of the moving image camera.

17. The lighting assembly according to claim 1, wherein the lighting assembly comprises at least two lighting elements for generating light, wherein the control system is arranged to provide a control for emitting a constant light with a first one of the lighting elements and emitting a pulsed light with a second one of the lighting elements.

18. The lighting assembly according to claim 1, wherein the control system is arranged to provide a control for emitting a constant light and/or a pulsed light that is optimized for capturing with the camera and/or human visual response by controlling the intensity and spectrum of the at least one lighting element.

* * * * *